Feb. 3, 1970 C. F. HOFMANN ET AL 3,493,531

RIGID CRACK RESISTANT RESINOUS CASTING COMPOSITION

Original Filed May 6, 1965

United States Patent Office 3,493,531
Patented Feb. 3, 1970

3,493,531
RIGID CRACK RESISTANT RESINOUS CASTING COMPOSITION

Charles F. Hofmann, Monroeville, Newton C. Foster, Pittsburgh, and Anthony J. Palumbo and James H. McWhirter, Sharon, Pa., assignors to Westinghouse Electric Corporation, Pittsburgh, Pa., a corporation of Pennsylvania Continuation of application Ser. No. 456,038, May 6, 1965, which is a continuation-in-part of application Ser. No. 406,104, Oct. 23, 1964. This application Feb. 23, 1968, Ser. No. 707,875
Int. Cl. C08g *30/12, 51/04*
U.S. Cl. 260—37 6 Claims

ABSTRACT OF THE DISCLOSURE

Electrical members and/or apparatus are insulated with compositions comprising critical proportions of epoxy resin, certain anhydride curing agents and powdered beryl. For each 100 parts of epoxy resin, about 50 to 90 parts of anhydride and about 400 to about 575 parts of beryl are employed. Hexahydrophthalic anhydride, tetrahydrophthalic anhydride and mixtures or eutectics thereof are suitable curing agents. The cured solid insulation has excellent resistance to cracking even when extensively exposed to thermal cycling.

Figure 1:
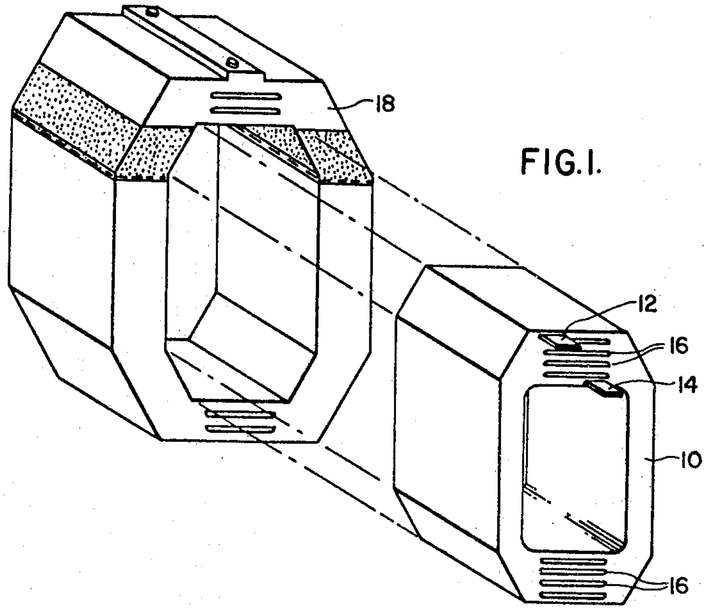

This application is a continuation of application Ser. No. 456,038, filed May 6, 1965 which is a continuation-in-part of application Ser. No. 406,104, filed Oct. 23, 1964, both assigned to the same assignee as this application and both now abandoned.

The present invention relates to a casting composition adapted for rigidly encapsulating electrical apparatus. The invention relates to an epoxy resin composition, to electrical apparatus embedded therein, and to the method of encapsulation.

More particularly, the invention relates to an epoxy resin casting composition characterized, upon curing, by its outstanding electrical strength, its excellent rigidity, and greatly improved resistance to cracking during thermal cycling in the use of the electrical apparatus encapsulated therewith.

It has long been recognized by those skilled in the art that the encapsulation in resins of electrical apparatus would provide thereto insulation of outstanding characteristics. This is particularly true in the case of electrical transformers, rectifiers and electronic equipment of various kinds. Many different resinous compositions have been developed which have exhibited good electrical insulating properties. Recently, the epoxy resins have attained widespread use in the electrical industry. This particular class of resins includes compositions ranging from liquid to solid form, and may therefore be employed over a wide area of applications.

In the employment of liquid epoxies for encapsulating various electrical members, the finally cured resins must be capable of withstanding many different types of stress. Of outstanding importance is their ability, in certain uses, to remain hard and rigid when heated and to withstand cracking upon severe sub-zero cooling. This is particularly true in the case of electrical transformers. During use, electrical transformers are subjected to severe thermal, variation from extremely low to quite elevated temperatures. It has been found over the past several years that, in general, the epoxies are deficient in their properties when subjected to temperature extremes with the result that they have been largely unsatisfactory as casting compositions for this application. In electrical equipment, the differences between the co-efficient of thermal expansion of the metallic elements and the resinous compositions have been so great that, invariably, loss of adhesion of the resins to the metal and cracking of the resins have occurred and have resulted in failure of the equipment. To a degree, these faults have been overcome by the use of elastomeric materials. However, as is often the case, the elastomeric materials are deficient in some aspects. The elastomers, generally, do not exhibit good electrical properties, have very low hot strength, have high coefficient of thermal expansion, and poor thermal stability. The prior art, therefore, has not developed a universally acceptable casting and encapsulating resinous electrical insulation.

It is a primary object of the present invention to provide a novel epoxy and/or epoxy novolac resinous casting composition characterized, in use, by excellent rigidity, strength and improved resistance to cracking during thermal cycling.

Another object of the invention resides in the provision of a liquid epoxy resin casting composition which exhibits excellent electrical insulating properties and which possesses greatly improved physical properties.

A further object resides in the provision of integrally cast electrical equipment employing the novel epoxy resin casting compositions of the invention, the equipment having greatly improved operation characteristics.

Another object of the invention is the provision of a method of casting integral electrical equipment with the novel epoxy resin casting compositions.

Other objects of the invention will, in part, be obvious and will, in part, become apparent from the following detailed description thereof.

The description will be given with particular reference to the drawings, in which:

FIGURE 1 is a perspective view illustrating the construction of a transformer wherein the low and high voltage windings are cast separately and then assembled, and FIGS. 2–5 are front elevation views, in section, illustrating successive castings and windings in the construction of an integral transformer coil assembly.

In accordance with the present invention and in the attainment of the foregoing objects there is provided a liquid casting and/or encapsulating composition comprising critical proportions of a liquid glycidyl polyether resin, a specific filler material, an anhydride resin curing agent, and a resin curing accelerator. The casting composition components are admixed forming pourable fluids either at room temperature or on heating to temperatures of about 100° C., and cast around the electrical member or members, and cured to a thermoset state by the application thereto of heat. The casting operation may be a single step procedure or, in some instances may comprise two or more steps as will be particularized hereinafter.

The resinous epoxy and/or epoxy novolac compositions which may be employed in the invention are, as stated hereinabove, liquids. They may be prepared by reacting predetermined amounts of at least one polyhydric phenol and at least one epihalohydrin in an alkaline medium. Phenols which are suitable for use in preparing the resinous polymeric epoxides include those which contain at least two phenolic hydroxide groups per molecule. Polynuclear phenols which have been found to be particularly suitable include those wherein the phenol nuclei are joined by carbon bridges such, for example, as 4,4'-dihydroxy-diphenyl-dimethyl-methane (referred to hereinafter as bisphenol A), 4,4'-dihydroxy-diphenyl-methyl-methane and 4,4'-dihydroxy-diphenyl-methane. In admixture with the named polynuclear phenols, use may also be made of those polynuclear phenols wherein the phenolic nuclei are joined by sulfur bridges such, for example, as 4,4'-dihydroxy-diphenyl-sulfone.

While it is preferred to use epichlorohydrin as the epihalohydrin in the preparation of the resinous polymeric epoxides of the present invention, homologues thereof, for example, epibromohydrin and the like may also be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The product of the reaction, instead of being a single simple compound, is generally a complex mixture of glycidyl polyethers, but the principal product may be represented by the formula:

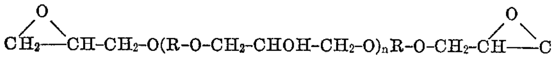

wherein $n$ is an integer of the series 0, 1, 2, 3, and R represents the divalent hydrocarbon radical of the dihydric phenol. While for any single molecule of the polyether $n$ may be 0, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The resinous polymeric epoxide, or glycidyl polyether of a dihydric phenol suitable for use in this invention has a 1,2-epoxy equivalency greater than 1.0 By epoxy equivalency reference is made to the average number of 1,2-epoxide groups:

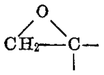

contained in the average molecule of the glycidyl ether. Owing to the method of preparation of the glycidyl polyethers and the fact that they are ordinarily a mixture of chemical compounds having somewhat different molecular weights and containing some compounds wherein the terminal glycidyl radicals are in hydrated form, the epoxy equivalency of the product is not necessarily the integer 2.0. The 1,2-epoxy equivalency of the polyethers is thus a value between 0 and 2.0.

Resinous polymeric epoxides or glycidyl polyethers suitable for use in accordance with the present invention may be prepared by admixing and reacting from one to ten mol proportions of an epilhalohydrin, preferably epichlorohydrin, with from one to three mol proportions of bis-phenol A in the presence of at least a stoichiometric excess of alkali based on the amount of halogen.

To prepare the resinous polymeric epoxides, aqueous alkali, bis-phenol A and epichlorohydrin are introduced into and admixed in a reaction vessel. The aqueous alkali serves to dissolve the bis-phenol A with the formation of the alkali salts thereof. If desired, the aqueous alkali and bis-phenol A may be admixed and the epichlorohydrin added thereto, or an aqueous solution of alkali and bis-phenol A may be added to the epichlorohydrin. In any case, the mixture is heated in the vessel to a temperature within the range of from about 80° C. to 110° C. for a period of time varying from about one-half hour to three hours, or more, depending on the quantity of reactants used.

Upon completion of heating, the reaction mixture separates into layers. The upper aqueous layer is withdrawn and discarded, and the lower layer, containing the desired epoxy, is washed with hot water to remove reacted alkali and halogen salts, in this case, sodium chloride. If desired, dilute acids, for example, acetic acid or hydrochloric acid, may be employed during the washing procedure to neutralize the excess alkali.

The liquid glycidyl polyethers suitable for use in accordance with the present invention may also be defined in terms of their epoxy equivalent weight. This value is derived by dividing the molecular weight of the composition by the average epoxy equivalency of the polyether. In the present case epoxy resins having epoxy equivalent weights within the range of about 170 to about 450 may be employed. Within this range, the preferred equivalent weight is from about 170 to about 250. Values above 250 result in relatively high viscosities and are therefore less desirable.

The glycidyl polyether-novolac resins suitable for combining with and for curing by catalysts in accordance with this invention are prepared by condensing an epihalohydrin with a novolac resin of an aldehyde and a monohydric mononuclear alkyl phenol containing at least four carbon atoms in the alkyl group, which novolac resin contains about three to twelve phenolic hydroxyl groups per average molecule. The term "novolac" as used herein refers to phenolaldehyde resins prepared by reacting at least one phenol with at least one aldehyde in the ratio of 1 mol of phenol to from about 0.5 to 0.85 mol of aldehyde using an acidic catalyst. The condensation is effected by mixing the novolac resin with at least 3 mols of an epihalohydrin such as epichlorohydrin per phenolic hydroxyl equivalent of novolac resin and with addition of about 1 mol of alkali metal hydroxide per phenolic hydroxyl equivalent of novolac resin. The reaction mixture is maintained within the range of about 60° C. to 150° C. during the ensuing reaction. Upon completion of the reaction, the formed alkali metal salt and any unreacted hydroxide are removed from the resulting epoxy-novolac resin and the resultant epoxy-novolac, in the form of a viscous liquid or solid, is separated from the reaction mixture and may be purified, if required.

The obtained epoxy-novolac resins may vary from very viscous liquids to solids at normal temperatures (20° C.). Even the normal solid resins are fusible. The resins have a very complicated chemical structure. Analysis indicates that the majority such as about 60 to 90 or more percent of the hydrogen atoms of the phenolic hydroxyl group of the original novolac resin are replaced by glycidyl radicals. The epoxy-novolac resins also contain an appreciable proportion of alcoholic hydroxyl groups which are largely present in 2,3-dihydroxypropyl radicals that have replaced hydrogen atoms of phenolic hydroxyl groups of the original novolac resin. A small proportion of chlorine is contained in the resin, some of which is present in 3-chloro-2-hydroxy propyl groups and some in more complicated groups which are 3-chloro-2-(3-chloro-2-hydroxypropyloxy) propyl and 3-chloro-2(2,3-epoxypropyloxy)propyl radicals linked to the phenolic ether oxygen atoms in the epoxy resin. The product may contain an insignificant amount of phenolic hydroxyl groups, i.e., at most, less than about .3 per average molecule.

The gylcidyl polyethers of this invention are cured by further reaction with ether one or both of certain selected anhydrides. Specifically, the anhydrides which may be employed are hexahydrophthalic anhydride, tetrahydrophthalic anhydride, and mixtures or eutectics thereof. The anhydrides are used in amounts of about 50–90 parts by weight for each 100 parts by weight of epoxy resin and/or epoxy novolac. Other anhydrides such as phthalic, maleic, and methyl nadic anhydride may also be present in small amounts up to about 20% by weight of the primary anhydrides.

In order that the glycidyl polyether-anhydride mixture may be cured within reasonable periods of time at temperatures of about 130°–150° C., it is desirable to employ a small amount, within the range of about 0.05–2.0 parts by weight, of an accelerator for each 100 parts of the gylcidyl polyether. The accelerators are selected from the group consisting of organic amines, metal amine chelates, amine borates, and polyborate esters. One or more of the accelerators may be employed simultaneously. Examples of suitable amines include monoethanolamine, piperidine, diethanolamine, triethanolamine, ethylenediamine, diethylenetriamine, dimethylaminopropylamine, pyrrolidine, and dimethylaminomethyl phenol. The metallic amine chelates which may form a portion of the curing catalyst of this invention may be prepared by initially reacting one mol of a metal ester, having the general formula $M(OR)_4$, in which R is 1 to 4 carbon atoms, with two mols of triethanolamine and distilling off two mols of the low boiling alcohol ROH where R represents the organic radical in the metal ester. Suitable metallic amine chelates which may be used in this invention include titanium amine chelate, aluminum amine chelate and silicon amine chelate. Particularly satisfactory results have been achieved when the metal amine chelate of this invention is titanium amine chelate.

The polyborate esters used in conjunction with the titanium amine chelate are well known in the art and are described in detail in U.S. Patent No. 2,941,981 to Elbling et al. Particularly satisfactory results have been achieved by using the polyborate ester-trihexylene glycol biborate.

In carrying out the casting procedure of the present invention, there is admixed, for each 100 parts by weight of the selected epoxy resin, about 400 to about 575 parts by weight of powdered beryl (beryllium aluminum silicate which may have present small amounts up to about 10% by weight of other fillers such as talc, silica, and the like), about 50 to about 90 parts by weight of the selected anhydride or anhydride mixture, and from about 0.05 to about 2.0 parts by weight of the selected curing accelerator. The mixture is heated to about 100° C. It has been found that the combination of anhydride with the epoxy base resin produces a very fluid system at this temperature. It has also been found that the inclusion of relatively small amounts of the order of 0.1 to 2% of a finely divided thixotropic agent in the resin-filler system prevents undue settling of the filler material. Suitable thixotropic agents include oxides of metals such as silicon, titanium, antimony, zinc, and the like of a particle size within the range of about 0.01–40 microns. The heated mixture is then poured around the particular electrical element to be encapsulated, in a suitable mold, and is baked at about 100° C. for about 4–20 hours followed by a postcure of about an equivalent time period at 150° C. to 180° C. The combination of relatively low viscosity-anhydride curved epoxy resin filled with about 75 or more percent by weight of beryllium aluminum silicate filler produces a cured, rigid resin characterized by excellent electrical and physical properties and which has a coefficient of thermal expansion low enough that the combination of these properties is productive of a resin with very excellent crack resistance even when in contact with massive metal components.

In order to more particularly describe the invention, the following specific examples are set forth. The parts given are by weight unless otherwise indicated. It is to be understood that the examples are given for the purpose of illustration only.

Example I

A liquid glycidyl polyether is prepared by introducing into a reaction vessel equipped with agitator, cooling and heating means, distillation condenser and receiver, 513 parts (2.25 mols) of bis-phenol A, 2081 parts (22.5 mols) of epichlorohydrin, and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin are removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin, and then added to the filtrate and both returned to the vessel. The benzene is then distilled off, the polyester resin being heated at an increasing temperature until at 125° C., vacuum is applied and distillation is continued until the vessel contents are at 170° C. at 25 mm. of mercury absolute pressure. The glycidyl polyester has an epoxy equivalent weight of about 180–210.

The following example describes the preparation of a particular metal amine chelate and polyborate ester.

Example II

Three mols of triethanolamine titanate an two mols of trihexylene glycol biborate are charged into a suitable vessel and heated at a temperature in the range of 100° C. to 135° C. for a period of approximately 3–4 hours.

The reaction product is a clear, slightly yellow liquid, suitable for use in accelerating the curing of glycidyl polyether resins in accordance with the teaching of the invention.

Example III

This example illustrates the preparation of an epoxy-novolac resin in which the novolac was a condensate of paratertiary butylphenol and formaldehyde. 328 parts of the novolac resin was dissolved in 920 parts of epichlorohydrin and 5 parts of water. Small pellets of sodium hydroxide in an amount of 82 parts were divided into six portions of approximately equal weight. The first portion was added to the solution with stirring and the mixture was heated rapidly to about 80° C. Heating was then discontinued and the heat of reaction carried the temperature up to about 100° C. At ten-minute intervals, the remaining portions of sodium hydroxide were added while keeping the temperature at about 95° C. to 100° C. After addition of all the sodium hydroxide, the mixture was stirred and refluxed for one hour. The epichlorohydrin and water were then distilled off at atmospheric pressure to a kettle temperature of about 130° C. While still warming, about 450 parts of benzene were added to the mixture and the precipitated sodium chloride was removed by filtration. The benzene was distilled off under vacuum up to a temperature of about 140° C. under a pressure of about 4 mm. of mercury, leaving 398 parts of epoxy-novolac resin.

Example IV

A casting resin composition is prepared by mixing together 100 parts of the epoxy resin produced in Example I, 80 parts of hexyhydrophthalic anhydride, 0.18 parts of dimethyl aminomethyl phenol, 5.4 parts of chromium oxide pigment, 506.0 parts of beryllium aluminum silicate, and 28.0 parts of silicon dioxide in finely divided form (average particle size of less than one micron). The formulation is mixed and cast around an electrical element at 100° C. The resin composition, at 100° C., has a viscosity ranging between 9000 and 12,000 cps. The cast assembly is then baked at 100° C. for 16 hours followed by a postcure bake of 16 hours at 150° C. Cast samples have been tested for crack resistance by the so-called 3M (Minnesota Mining and Manufacturing Company) washer test and a "bolt washer test." All samples passed both of these tests successfully.

In the 3M washer test, a steel washer ¼" thick and 1½" diameter encapsulated in the resin composition is cycled 10 times from room temperature to about −75° C. in a Dry Ice-acetone bath. The washer is held at the lower temperature for about 20 minutes in each cycle. The sample must pass this test without cracking before being further tested.

The "bolt washer test" uses a series of square steel washers of 1¾" and 2" sides and ⅛" thickness and with two interposed vulcanized fiber washers 1½" on a side and about ½" thickness on a 5" long ½" diameter steel bolt with a threaded hexagonal nut at one end. The encapsulated bolt, nut and washers embedded in a 2½" thick block of over 4" in lateral dimensions of the cured resin composition is cycled a maximum of 30 times between 150° C. and −30° C. and held at each of these temperatures for 6 hours during each cycle. Severe stress is placed on the encapsulating resin component of the system during this cycling test.

The resin composition has been employed to embed foil wound transformer coils. As shown in FIG. 1, a low voltage coil 10 is embedded by one casting operation. Leads 12 and 14 extend from the casting. In this cast element, circulation ducts are shown at 16 .The cast coil 12 fits into the centrally disposed space in a cast high voltage coil 18 prepared in a separate casting operation. Alternatively, the high voltage coil may be wound directly on the cast coil 10 and this assembly cast in the resin-filler composition to provide an integral casting.

Equally good results have been obtained with casting compositions where the finely divided silica was omitted.

Example V

A casting composition was prepared as follows:

(A) 100 parts of an epoxy resin of Example I having an epoxy equivalent weight of about 180–210 were mixed with 280 parts of beryl, and 10 parts of finely divided (less than one micron average particle size) silicon dioxide.

(B) 80 parts of a mixture of 80% hexahydrophthalic anhydride and 15% tetrahydrophthalic anhydride were mixed with 223 parts of beryl, 8 parts of finely divided (less than one micron average particle size) silicon dioxide, and 0.5 part of the accelerator of Example II. The two portions (A) and (B) were blended in an automatic dispensing apparatus. The composition was cast in a multiple step operation around foil wound transformer coils wherein an enameled aluminum foil was employed. The mixture was poured at about 100° C.

Figure 2:
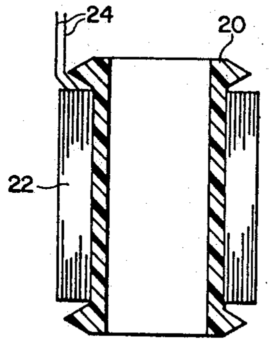
Figure 3:
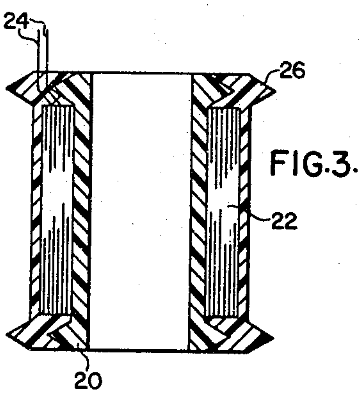
Figure 4:
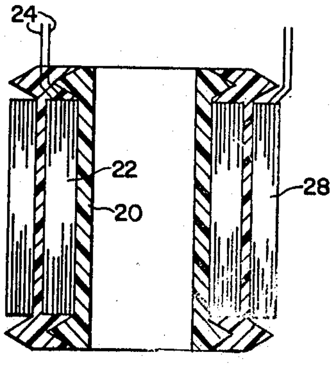
Figure 5:
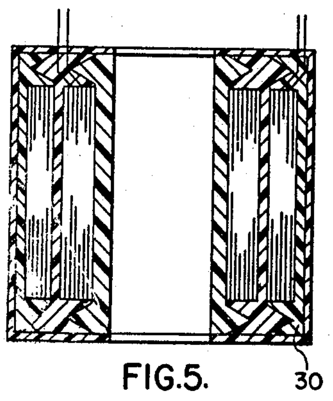

Reference may be had to FIGS. 2–5 for an understanding of the multiple casting technique employed using this casting composition. FIG. 2 illustrates a coil form 20 and a foil wound low voltage coil 22 wound therearound. The coil lead is shown at 24. FIG. 3 illustrates the first cast layer 26 of resin-filler composition. FIG. 4 illustrates a high voltage coil 28 wound directly around the first resin-filler layer 26. FIG. 5 illustrates the final cast assembly with the outer resin-filler layer 30 which results in an integral transformer coil assembly. The final product has been subjected to a complete series of comparative thermal cycling and electrical tests and exhibited excellent electrical properties, outstanding rigidity, and complete absence of cracking. It is to be understood that additional windings and castings may be resorted to where more than two coils are required.

Example VI

A foil wound coil assembly similar to that of Example IV was cast with the following casting resin.

| | Parts |
|---|---|
| Epoxy resin from Example I (epoxy equiv. wt. 180–210) | 50 |
| Epoxy novolac from Example III (equiv. wt. 175–182) | 50 |
| Hexahydrophthalic anhydride | 76.5 |
| Tetrahydrophthalic anhydride | 8.5 |
| Beryllium aluminum silicate | 530 |
| Dimethyl aminomethyl phenol | 0.18 |
| Silicon dioxide | 18 |

The viscosity of the resin at 100° C. was 5000–7000 cps. Casting around transformer coils was performed at this temperature. The cast assembly was postcured for 16 hours at 150° C. and had excellent electrical and thermal properties.

The cured resin-filler composition had a tensile strength at 25° C. of 11,300 p.s.i. and at 100° C. a tensile strength of 7,400 p.s.i. Modulus elasticity at similar temperatures were, respectively $3.43\times10^6$ and $2.88\times10^6$ p.s.i. The cured composition successfully passed both the 3M washer test and the bolt washer test. The novel epoxy resin casting compositions are equally applicable in casting wire wound coils for both distribution and power transformers.

From the foregoing description, it will be apparent that the present invention provides to the art, for the first time, an epoxy resin casting composition which produces a completely rigid, crack resistant encapsulant. Moreover, where the prior art casting resins were employed mainly for environmental protection and strength, the novel casting compositions of the invention contribute outstanding electric strength to the cast electrical assemblies.

We claim as our invention:

1. A liquid resinous-filler casting composition for encapsulating electrical apparatus having metal electrical members, the composition comprising (A) for each 100 parts by weight of a liquid resin selected from the group consisting of epoxy and epoxy-novolac resins and mixtures thereof and having terminal epoxy groups and an epoxy equivalent weight of about 150–450, (B) about 400–575 parts by weight of powdered beryl, (C) about 50–90 parts by weight of an anhydride resin curing agent consisting of hexahydrophthalic anhydride, with up to about 20 percent of an anhydride selected from the group consisting of phthalic anhydride, maleic anhydride, methyl nadic anhydride and mixtures thereof, and (D) about 0.05–2.0 parts by weight of a resin curing accelerator.

2. The composition of claim 1 wherein the resin curing accelerator is at least one accelerator selected from the group consisting of organic amines, metal amine chelates, and polyborate esters.

3. Electrical apparatus comprising a metallic electrical member, the apparatus encapsulated or embedded in the fully cured rigid composition of claim 1.

4. The electrical apparatus of claim 3 wherein the resin curing accelerator is at least one accelerator selected from the group consisting of organic amines, metal amine chelates and polyborate esters.

5. The electrical apparatus of claim 3 wherein the metallic electrical member is a wound coil.

6. The electrical apparatus of claim 3 wherein the metallic electrical member is at least one aluminum foil coil.

References Cited

UNITED STATES PATENTS 2,948,930 8/1960 Herbst ---------- 18—59
3,310,520 3/1967 Girard ---------- 260—37

OTHER REFERENCES

Harper: Electronic Packaging With Resins, McGraw-Hill Book Co., Inc., 1961, TN7870N28, pp. 41, 47, 130 and 132.

ALLAN LIEBERMAN, Primary Examiner

SAMUEL L. FOX, Assistant Examiner

U.S. Cl. X.R.

264—272